US008447330B2

(12) United States Patent
Chakravarty et al.

(10) Patent No.: US 8,447,330 B2
(45) Date of Patent: May 21, 2013

(54) SYSTEM FOR WIRELESS LOCATION ESTIMATION USING RADIO TRANSCEIVERS WITH POLARIZATION DIVERSITY

(75) Inventors: Tapas Chakravarty, Kolkata (IN); Chethan Puttanna Konanakera, Tumkur (IN); Prabha Janardan, Bangalore (IN); Mariswamy Girish Chandra, Bangalore (IN); Balamuralidhar Purushothaman, Bangalore (IN)

(73) Assignee: Tata Consultancy Services Ltd., Mumbai (IN)

( * ) Notice: Subject to any disclaimer, the term of this patent is extended or adjusted under 35 U.S.C. 154(b) by 0 days.

(21) Appl. No.: 13/455,848

(22) Filed: Apr. 25, 2012

(65) Prior Publication Data

US 2013/0023283 A1 Jan. 24, 2013

Related U.S. Application Data

(63) Continuation of application No. PCT/IN2010/000695, filed on Oct. 27, 2010.

(30) Foreign Application Priority Data

Oct. 30, 2009 (IN) .......................... 2528/MUM/2009

(51) Int. Cl.
*H04W 24/00* (2009.01)
(52) U.S. Cl.
USPC ..................................... 455/456.1; 455/404.2
(58) Field of Classification Search
USPC .......................................... 455/456.1, 404.2
See application file for complete search history.

(56) References Cited

U.S. PATENT DOCUMENTS

| 3,047,864 A | 7/1962 | Byatt |
| 6,195,064 B1 | 2/2001 | Andrews et al. |

(Continued)

FOREIGN PATENT DOCUMENTS

| CN | 101247650 A | 8/2008 |
| CN | 101424735 A | 5/2009 |

(Continued)

OTHER PUBLICATIONS

Bahl, Paramvir, et al., "An In-Building RF-Based User Location and Tracking System", INFOCOM, vol. 2, Mar. 2000, pp. 775-784.

(Continued)

*Primary Examiner* — Barry Taylor
(74) *Attorney, Agent, or Firm* — Robert Plotkin, P.C.

(57) ABSTRACT

A system and method for wireless location estimation of a mobile node using radio transceivers with polarization diversity have been disclosed. The system includes a plurality of pre-defined fixed reference nodes distributed over a predetermined area adapted to transmit fixed reference signals. The system further includes mobile node transmission module at the mobile node adapted to transmit mobile reference signals with respect the mobile node and plurality of pre-defined fixed reference nodes. The horizontal polarization module and vertical polarization module polarize the transmitted mobile reference signals and the strength of the signals is measured. The derivation module derives the range of the signals. Subsequently, a profile of the derived range with reference to the measured signal strength is created by the system. The system further employs a trilateration algorithm to determine localization of the node using the created profile, thereby providing the location estimation for the mobile node.

5 Claims, 5 Drawing Sheets

U.S. PATENT DOCUMENTS

| | | | |
|---|---|---|---|
| 6,590,536 | B1 | 7/2003 | Walton |
| 7,257,411 | B2 | 8/2007 | Gwon et al. |
| 7,272,394 | B2 | 9/2007 | Krishnakumar et al. |
| 7,558,583 | B2 | 7/2009 | Ledeczi et al. |
| 7,567,794 | B2 | 7/2009 | Dempsey |
| 2004/0095278 | A1 | 5/2004 | Kanemoto et al. |
| 2004/0102196 | A1* | 5/2004 | Weckstrom et al. ........ 455/456.1 |
| 2009/0227260 | A1 | 9/2009 | Anreddy et al. |
| 2010/0238862 | A1* | 9/2010 | Davidson et al. ............. 370/328 |

FOREIGN PATENT DOCUMENTS

| | | |
|---|---|---|
| WO | 01/06401 A1 | 1/2001 |
| WO | 2008/077991 A1 | 7/2008 |
| WO | 2008/147467 A2 | 12/2008 |
| WO | 2010/022785 A1 | 3/2010 |

OTHER PUBLICATIONS

Bektas, Filiz, et al., "Bluetooth Communication Employing Antenna Diversity", Proceedings of the Eighth IEEE International Symposium on Computers and Communication (ISCC'03), Jul. 30, 2003, 6 pages.

Dietrich Jr., Carl, et al., "Spatial, Polarization, and Pattern Diversity for Wireless Handheld Terminals", IEEE Transactions on Antennas and Propagation, vol. 49, No. 49, Sep. 2001, pp. 1271-1281.

Elnahrawy, Eiman, et al., "The Limits of Localization Using Signal Strength: A Comparative Study", Proceedings of IEEE SECON 2004, vol. 6, 2004, 9 pages.

Enge, Per, et al., "Special Issue on Global Positioning System", Scanning the Issue/Technology, Proceedings of the IEEE, vol. 87, No. 1, Jan. 1999, pp. 3-15.

Hightower, Jerey, et al., "Design and Calibration of the SpotON Ad-Hoc Location Sensing System", Aug. 2001, 18 pages.

Krishnan, P., et al., "A System for LEASE: Location Estimation Assisted by Stationary Emitters for Indoor RF Wireless Networks", Twenty-third Annual Joint Conference of the IEEE Computer and Commuications Societies INFOCOM 2004, vol. 2, Mar. 7-11, 2004, pp. 1001-1011.

Ni, Lionel M., et al., "LANDMARC: Indoor location sensing using active RFID", Wireless Networks, vol. 10, 2004, pp. 701-710.

Patwari, Neal, et al., "Using Proximity and Quantized RSS for Sensor Localization in Wireless Networks", Proceedings of the 2nd ACM international conference on Wireless sensor networks and applications, Sep. 19, 2003, 10 pages.

International Search Report received for International Patent Application No. PCT/IN2010/000695, mailed on May 19, 2011, 3 pages.

Priyantha, Nissanka., et al., "The Cricket Location-Support System", 6th ACM International Conference on Mobile Computing and Networking (ACM MOBICOM), Aug. 2000, 12 pages.

Roos, T., et al., "A Statistical Modeling Approach to Location Estimation", IEEE Transactions on Mobile Computing, vol. 1, Issue 1, Jan.- Mar. 2002, pp. 1-11.

Savarese, Chris, et al., "Locationing in Distributed AD-Hocwireless Sensor Networks", IEEE International Conference on Acoustics, Speech and Signal Processing, vol. 4, May 2001, pp. 2037-2040.

Singh, Reetu, et al., "A Statistical Modelling Versus Geometrical Location Determination Approach for Static Positioning in Indoor Environment", Proceedings of the International Symposium on Wireless Personal Multimedia Communications (WPMC '05), Sep. 18-22, 2005, pp. 1-5.

Want, Roy, et al., "The Active Badge Location System", ACM Transactions on Information Systems, vol. 40, No. 1, Jan. 1992, 10 pages.

Bialkowski, K. S.., et al., "Demonstrating the effects of multi-path propagation and advantages of diversity antenna techniques", Proceedings of IEEE Antennas and Propagation Society International Symposium, vol. 3, 2003, pp. 654-657.

* cited by examiner

FIGURE 1

PRIOR ART

SYSTEM FOR WIRELESS LOCATION ESTIMATION USING RADIO TRANSCEIVERS WITH POLARIZATION DIVERSITY

CROSS-REFERENCE TO RELATED APPLICATIONS

This application is a continuation of PCT Patent Application Serial Number PCT/IN2010/000695, filed on Oct. 27, 2010, entitled, "System for Wireless Locations Estimation Using Radio Transceivers with Polarization Diversity," which claims priority from Indian Patent Application Serial Number 2528/MUM/2009, filed on Oct. 30, 2009.

FIELD OF DISCLOSURE

This disclosure relates to the field of wireless transmission and reception. Particularly, this disclosure relates to a system for wireless location estimation using radio transceivers with polarization diversity.

BACKGROUND

Wireless sensor networks are being extensively used to study various aspects of the physical environment which are complex in nature. They are deployed for a wide range of applications such as environmental monitoring, location tracking in retail chains, gathering military intelligence, providing disaster relief, factory instrumentation, hospital management and information tracking, and the like. Many of these applications require the sensing of location of individual nodes.

The technique of wireless localization, for estimating the position of a mobile wireless node, is an area that has attracted much attention in recent years. The following papers disclose this in detail:

"A system for LEASE: location estimation assisted by stationary emitters for indoor RF wireless networks"; Proc. IEEE INFOCOM 2004, 2004; P. Krishnan, A. S. Krishnakumar, W. H. Ju, C. Mallows, and S. Ganu, "Locationing in distributed ad-hoc wireless sensor networks"; IEEE International Conference on Acoustics, Speech and Signal Processing, 2001, Salt Lake City, Utah, Volume: 4, Page(s): 2037-2040, May, 2001; C. Savarese, J. M. Rabaey, J. Beutel "A statistical modeling versus geometrical determination location approach for static positioning in indoor environment"; Proceedings of the International Symposium on Wireless Personal Multimedia Communications (WPMC '05), Aalborg, Denmark, September 2005; R. Singh, L. Macchi, and C. S. Regazzoni "An In-Building RF-based User Location and Tracking System"; INFOCOM (2) (March 2000) pp. 775-784; Paramvir Bahl, Venkata N. Padmanabhan, RADAR "Design and Calibration of the SpotON Ad-Hoc Location Sensing System"; August 2001; Jeffrey Hightower, Chris Vakili, Gaetano Borriello, and Roy Want The most popular system, GPS as disclosed in "Special Issue on GPS: The Global Positioning System"; Proceedings of the IEEE, Volume 87, Number 1, pp. 3-172, January 1999; Per Enge, Pretap Misra, uses radio time-of-flight lateration via satellites, but has the limitation of only working outdoors.

Localization also done using sound as disclosed in "The cricket location-support system"; 6th ACM International Conference on Mobile Computing and Networking, August 2000; IEEE Communications Society/WCNC 2005 2353 0-7803-8966-2/05; N. B. Priyantha, A. Chakraborty, and H. Balakrishnan, using infrared as disclosed in "The Active Badge Location System"; ACM Transactions on Information Systems, Vol. 40, No. 1, pp. 91-102, January 1992; Roy Want, Andy Hopper, Veronica Falcao, Jon Gibbons, and using radio frequency identification (RFID) as disclosed in "Landmarc: Indoor location sensing using active RFID" in First IEEE International Conference on Pervasive Computing and Communications, March 2003, pg. 407; L. M. Ni, Y. Liu, Y. C. Lau, and A. P. Patil, relies on specialized hardwares and infrastructures which, in turn, incur additional costs. This will prohibit the use of such schemes in low-cost sensor nodes.

Localization is also done using radio interferometry as disclosed in U.S. Pat. No. 7,558,583 in which the phase offsets of the interference signal received by two receivers are measured. But here the sources of errors like multipath fading, antenna orientation, signal processing errors are more.

A very popular distance based single hop localization technique is trilateration as disclosed in "Demonstrating the effects of multi-path propagation and advantages of diversity antenna techniques"; Proc. IEEE Ant. Propag. Symposium, 2003; K. S. Bialkowski, A. Postula, is a method to find the position of an object based on distance measurements to three objects with known positions. Single-hop localization algorithms can be used in indoor and small scale outdoor applications, however, this approach is not scalable and requires the topology of the network to cover a very limited area and requires precise range measurements. As the density of nodes decrease, measurement errors increase.

Perhaps, the most important criterion of a successful location estimation technique is the accuracy of the model. Thus the quality indicators of the deployed system are reliability and the error of estimate (in percentage terms) in the given area of operation.

One of the known methods for such estimation is one using received signal strength indicator (RSSI). RSSI based localization systems are simple and inexpensive and can be used for indoor environments for estimating the locations. It is known that RSSI based localization algorithms suffer from deleterious effects of severe multipath phenomenon in indoor environments. Elnahrawy et al as disclosed in "The limits of localization using signal strength: A comparative study"; Proc. IEEE SECON 2004, 2004. [6] Kamin Whitehouse, David Culler, Macro-Calibration in Sensor/Actuator Networks, Mobile Networks and Applications, Kluwer Academic Publishers 2003, have investigated the fundamental limits of localization for wireless sensor networks using received signal strength.

The theoretical lower bounds on location estimation error (Cramer-Rao bound) using RSSI has been derived in "Using proximity and quantized RSS for sensor", Proc. of 2nd ACM Int. Conf. on Wireless Sensor Network, 2003; N. Patwari and A. O. Hero III. Roos et al as disclosed in "A statistical modeling approach to location estimation"; IEEE Trans. Mobile Computing, 1(1), 2002, 59-69, presented a statistical modeling framework, which enables location estimation based on statistical power model.

The above discussion indicates that the RSSI based indoor localization is highly researched and the roadmap to future research indicates the requirement of an accurate model which can enable localization with precision and minimum efforts in deployment and measurements. For majority of instances, the investigators have based their models only on single channel measurements. However, use of diversity techniques is known to improve reliability of a propagation channel. It is often seen that diversity measurements lead to conclusions of better signal-to-noise ratio; and thereby reliability specifically meant for data communication. Different diversity techniques, including polarization diversity have been described in "*Bluetooth communication employing diversity*"; Proc. ISCC, 2003; F. Bektas, B. Vondra, P. E. Veith, L. Faltin, A. Pohl and A. L. Scholtz, for indoor communication set up.

Figure 1:
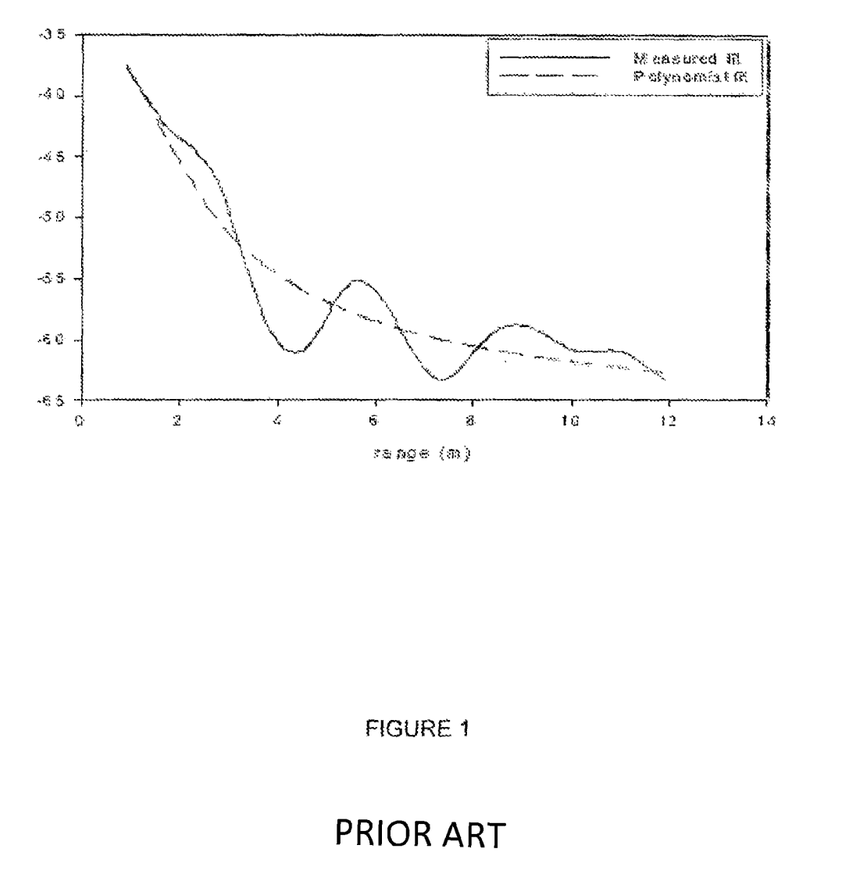
FIG. 1 illustrates a Typical RSSI profile for a ZigBee radio link.

It is thus seen, from FIG. 1 of the accompanying drawings, that there is immense challenge in obtaining a stable RSSI Vs distance profile for indoor environment; in particular having a monotonic behavior. FIG. 1 shows a typical RSSI profile for a ZigBee radio link. The variance in the RSSI values introduces error in the location estimation while the nonmonotonic characteristic gives raise to ambiguity. Since in real life deployment in dense indoor environment, RSSI based distance estimation can lead to multiple distance estimates, there is strong challenge in creating a simple algorithm which will estimate the distance with great accuracy.

Polarization Diversity in Indoors is Discussed Below:

It is known that RSSI can be improved using polarization diversity. As the likelihood is that the signal will suffer some level of attenuation, as it disperses slightly and propagates along fading channel in a given polarization, it is known that propagation characteristics in wireless communication systems are different for vertically and horizontally polarized waves as disclosed in "*Spatial, polarization, and pattern diversity for wireless handheld terminals*"; Dietrich, C. B., Jr.; Dietze, K.; Nealy, J. R.; Stutzman, W. L.; Antennas and Propagation, IEEE Transactions on Volume 49. Multiple reflections between the transmitter and the receiver lead to depolarization of radio waves, coupling some energy of the transmitted signal into the orthogonal polarized wave. Due to that characteristic of multipath radio channel, vertically/horizontally polarized transmitted waves have also horizontal/vertical component (i.e., additional diversity branch).

A thorough investigation through extensive_experimentations revealed that the packets of deep fading in one polarization often do not coincide with that in other polarization. This phenomenon leads to a reasonable conclusion that in indoor and a RF challenged environment, polarization rotation is a major source of signal attenuation.

OBJECTS

Some of the non-limiting objects of the present disclosure, which at least one embodiment herein satisfy, are as follows:

An object of the disclosure is to accurately estimate the position of a mobile wireless node.

Another object of the disclosure is to provide a reliable system and method for estimating the position of a mobile wireless node.

SUMMARY

The present disclosure envisages a system for wireless location estimation of a mobile node using radio transceivers with polarization diversity, the system comprising:
 a plurality of fixed transmission module at pre-defined fixed reference nodes distributed over a predetermined area adapted to transmit fixed reference signals;
 mobile node transmission module at the mobile node adapted to transmit mobile reference signals with respect to the mobile node and the plurality of pre-defined fixed reference nodes with fixed reference signals;
 horizontal polarization module adapted to horizontally polarize the transmitted mobile reference signals;
 vertical polarization module adapted to vertically polarize the transmitted mobile reference signals;
 receiver module adapted to receive the horizontally polarized signals and the vertically polarized signals;
 measurement module adapted to measure signal strength of the received signals;
 derivation module adapted to derive range of the received signals;
 profile creation module adapted to create a profile of the derived range with reference to the measured signal strength; and
 trilateration module adapted to employ a trilateration algorithm to determine localization of the node using the created profile, thereby provide the location estimation of the mobile node.

Typically, in accordance with the present disclosure, the profile creation module includes quadrature combining module adapted to create a profile by quadrature combining the measured signal strength from the horizontally polarized signal and the vertically polarized signal.

Typically, in accordance with the present disclosure, the profile creation module includes polynomial fitting computation module adapted to compute a polynomial fit for the derived profile with a pre-defined monotonic curve as a reference curve for further use in localization estimation.

Typically, in accordance with the present disclosure, the profile trilateration module is a selection based trilateration module with virtual sampling adapted to reduce the error in estimated localization of the node.

The present disclosure envisages a method for wireless location estimation of a mobile node using radio transceivers with polarization diversity, the method comprising the following steps:
 transmitting fixed reference signals using a plurality of fixed transmission module at pre-defined fixed reference nodes distributed over a predetermined area;
 transmitting mobile reference signals with respect to the mobile node and the plurality of pre-defined fixed reference nodes with fixed reference signals using mobile node transmission module at the mobile node;
 horizontally polarizing the transmitted mobile reference signals;
 vertically polarizing the transmitted mobile reference signals;
 receiving the horizontally polarized signals and the vertically polarized signals;
 measuring signal strength of the received signals;
 deriving range of the received signals;
 creating a profile of the derived range with reference to the measured signal strength; and
 employing a trilateration algorithm to determine localization of the node using the created profile, thereby provide the location estimation of the mobile node.

Typically, in accordance with the present disclosure, the step of creating a profile includes the step of creating a profile by quadrature combining the measured signal strength from the horizontally polarized signal and the vertically polarized signal.

Typically, in accordance with the present disclosure, the step of creating a profile includes the step of computing a polynomial fit for the derived profile with a pre-defined monotonic curve as a reference curve for further use in localization estimation.

BRIEF DESCRIPTION OF THE ACCOMPANYING DRAWINGS

The System for wireless location estimation using radio transceivers with polarization diversity will now be described with reference to the non-limiting, accompanying drawings, in which.

DETAILED DESCRIPTION OF THE ACCOMPANYING DRAWINGS

In accordance with the present disclosure, there is envisaged a system and scheme for wireless location estimation based on a derived profile from received signal strengths, measured in multiple antenna polarizations as a calibration data, in conjunction with an enhanced trilateration algorithm to improve the accuracy of the location estimate.

According to this disclosure, there is envisaged a significant improvement in robust RSSI estimation using dual radio system at the reference nodes by observing simultaneously the received signal strength from a transmitting node, which may be mobile node, employing horizontal and vertically polarized antennas respectively. The measured RSSI at two polarizations at each reference node are combined optimally to generate a derived range versus signal strength profile which has near monotonic characteristics. The derived RSSI profile at each reference node is used as a range calibration data for further estimation of the mobile node location using an enhanced trilateration algorithm.

In accordance with the present disclosure, the system for wireless location estimation of a mobile node includes a plurality of fixed transmission modules at pre-defined fixed reference nodes which are distributed over a predetermined geographical area. The fixed reference nodes are adapted to transmit fixed reference signals.

In accordance with the present disclosure, the mobile node includes mobile node transmission module adapted to transmit mobile reference signals with respect to the location of the mobile node and the plurality of pre-defined fixed reference nodes, The system further includes a horizontal polarization module adapted to horizontally polarize the transmitted mobile reference signals and a vertical polarization module adapted to vertically polarize the transmitted mobile reference signals, The system, in accordance with the present disclosure further includes a receiver module adapted to receive the horizontally polarized signals and vertically polarized signals from the horizontal polarization module and the vertical polarization module respectively.

The system, in accordance with the present disclosure further includes a measurement module adapted to measure the signal strength corresponding to the received signals, The system, in accordance with the present disclosure includes a derivation module which is adapted to derive the range corresponding to the received signals.

The profile creation module creates a profile which includes at least the derived range of the received signals. The range of the received signals is measured with reference to the measured signal strength. The system further includes a trilateration module which is adapted to employ a trilateration algorithm to determine the localization of the mobile node using the profile created by the profile creation module, thereby providing the location estimation corresponding to the mobile node.

The profile creation module, in accordance with the present disclosure includes a quadrature combining module adapted to create a profile by quadrature combining the strengths of the horizontally polarized signal and vertically polarized signal.

The profile creation module, in accordance with the present disclosure further includes a polynomial fitting computation module which is adapted to compute a polynomial fit for the derived profile with a pre-defined monotonic curve as a reference curve for further use in the localization estimation.

In accordance with the present disclosure, the trilateration module is a selection based trilateration module with virtual sampling. The trilateration module is adapted to reduce the error in estimated localization of the mobile node.

Still particularly, the system of this disclosure envisaged to use a novel methodology for robust wireless location estimation in following steps:
a) Generation of a derived RSSI profile by quadrature combining the RSSI measurements from simultaneous transmissions in two polarizations
b) Generation of a polynomial fit for the derived RSSI profile with an error margin to get a monotonic curve as a reference curve for further use in location estimation
c) Use of a novel algorithm "Selection based trilateration algorithm with virtual sampling (STAVS)" to reduce the error in estimated location of the target.

In accordance with this disclosure, there is described a new technique for indoor localization to reduce the estimated range error introduced by interference and/or path loss; where the cumulative errors is controlled substantially as compared to other existing techniques.

The disclosure exploits the polarization diversity by using dual radio system at the reference node to obtain a robust RSSI. This method reduces the variance of multiple RSSI measurements corresponding to a specific distance from the transmitter.

An RSSI Vs Distance profile is generated through experimentation for each polarization. A derived profile is generated by combining the signal strengths in two polarizations using the following formula $$S_d = 10 \log_{10} \{\sqrt{S_V^2 + S_H^2}\} \quad (1)$$

Figure 2:
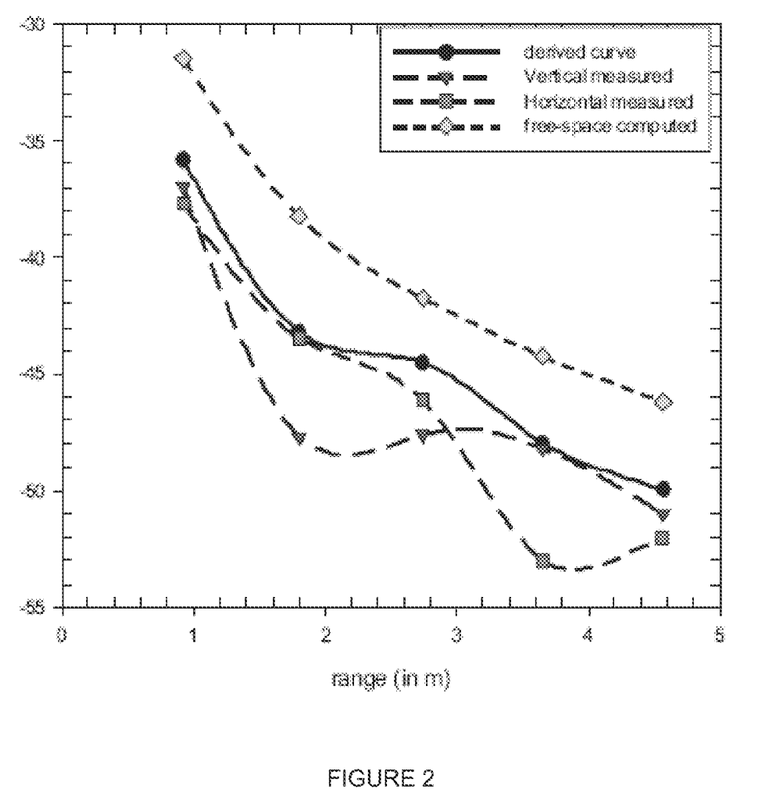
FIG. 2 illustrates Derived path loss (by measurement) and comparison with free-space path loss.

Where,
$S_V$—RSSI received in vertical polarization (with transmission also in same polarization)
$S_H$—RSSI received in horizontal polarization (with transmission also in same polarization)
$S_d$—Derived RSSI profile FIG. 2 of the accompanying drawings shows $S_v$, $S_h$, and $S_d$ for a typical measurement.

The derived profile with the quadrature combining of the signal in both polarizations will have a reduced variance corresponding to repeated measurements at a specific distance. The variance is typically within ±3 db. Subsequently the derived Signal profile ($S_d$) is fitted with a (1–n) polynomial taking care of this variance to get a reference curve for propagation path loss, $S_f$.

The propagation path loss is predicted as follows:

$$S_f = y_0 + a \ln(d)(\text{dB}) \quad (2)$$

Where, d is range in m

Figure 3:
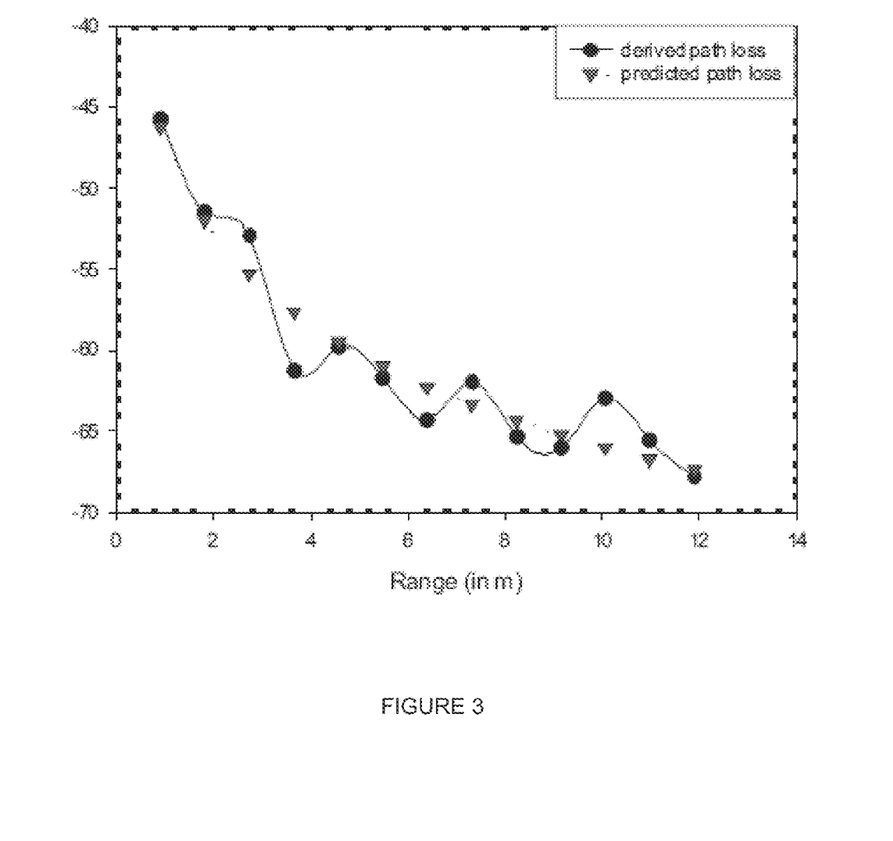
FIG. 3 of the accompanying drawings, displays the derived curve as well as the predicted curve.

Here the values of the constant depend on the environment. For example, inside a typical office space, $y_0 \sim -42$ to $-44$ dB and $a \sim -11.5$ to $-12.5$ FIG. 3 of the accompanying drawings, displays the derived curve as well as the predicted curve. The derived path loss (using eq. 1) and the predicted path loss (using eq. 2) are shown.

The reference curve obtained by the polynomial fit described above will be used for the new Selection based Trilateration Algorithm with Virtual Sampling (STAVS). The detail of the STAVS algorithm is described below.

Selection based Tri-lateration Algorithm with Virtual Sampling (STAVS) is described as below:

The reference profile generated by the polynomial fitting of $S_d$ is used for estimating the range corresponding to a derived RSSI value. It has been stated earlier that any derived point measurements of RSSI (using polarization diversity) will generally have a variance and that could be of the order of a maximum of 3 dB. So the ideal value of the RSSI (in the absence of any fading) can be assumed to be randomly distributed within an interval of ±3 dB. This information is used to generate additional virtual RSSI samples falling within this interval.

It is known that for trilateration at least three reference nodes are required to estimate the absolute location of a transmitter (of the mobile node). Distances of the mobile node from three reference nodes are estimated from the reference curve. There will be one distance value for each of the virtual RSSI samples.

The distance estimation is done by using eq 2, where we consider that the derived RSSI as per eq. 1 ($S_d$) is same as $S_f$ as in eq. 2. Then using eq. 2, the distance 'd' is computed.

Use of more than three reference nodes provides additional measurement samples enabling a better estimate. Let us consider four reference nodes <N1,N2,N3,N4> and let <d1,d2,d3,d4> be the corresponding distances of the mobile node (from those reference nodes respectively) Now any triplet combination of the distances d1,d2,d3,d4 can be used to estimate the absolute location of the mobile node. That is the triangles formed by the triplets <d1, d2, d3>, <d1, d3, d4>, <d1, d2, d4>, <d2, d3, d4> can be used for location estimation of the mobile node using trilateration.

It can be seen that the estimation error for a location within the triangle formed by the triplet is less than that corresponding to a location outside the triangle. Therefore if the location estimated from a triplet falls outside the corresponding triangle then that may be discarded because of they are comparatively more noise prone. This is the basic idea behind selection based trilateration.

Finally all selected location data <xi,yi> from STAVAS is averaged to find the final estimated location <X,Y> of the mobile node.

The system's implementation is described below:

A system of radio transceivers involving a set of reference nodes (fixed with known positions) is deployed to cover an area and a mobile radio within the designated area for which the position needs to be estimated.

All the nodes involved in the above system have the capability to work in two polarizations. The receiving nodes will have two receivers with antennas connected in different polarizations (Vertical & Horizontal). Transmitter will have two antennas in different polarizations and can transmit in one polarization at a time.

Figure 4:
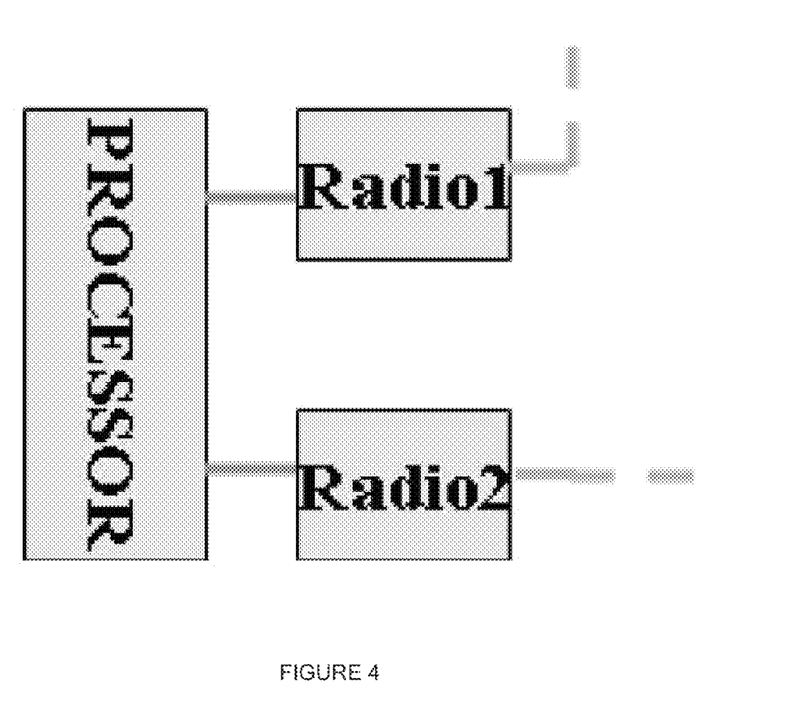
FIG. 4 illustrates a Schematic implementation of a typical node with dual Radios for the communication node.

Implementation of dual radio system for the communication node is shown FIG. 4. The figure depicts that each reference node has two radio systems one in horizontal polarization and another in vertical polarization.

As shown in FIG. 4, each of the reference nodes has two separate transceivers. One transceiver (Radio 1) works in vertical polarization and another transceiver (Radio 2) works in horizontal polarization. The processor communicably coupled to radio 1 and radio 2 measures the signal strength from each polarization and combines them using equation 1 and transmits that RSSI values to a sink node while adding its node ID with the information. The next section will discuss about experimental setup of the work being carried out.

Indoor localization technologies have been developed on various concepts and aspects. Here it is considered that the placements of nodes are in a regular geometrical shape rectangle, in this phase reference nodes are placed at the corners of the rectangle and carry out the experiment. There are four reference nodes which are placed at four corners of the working room as shown FIG. 5 of the accompanying drawings Each reference node has two radios one for horizontal polarization and another for vertical polarization as shown in FIG. 4.

Figure 5:
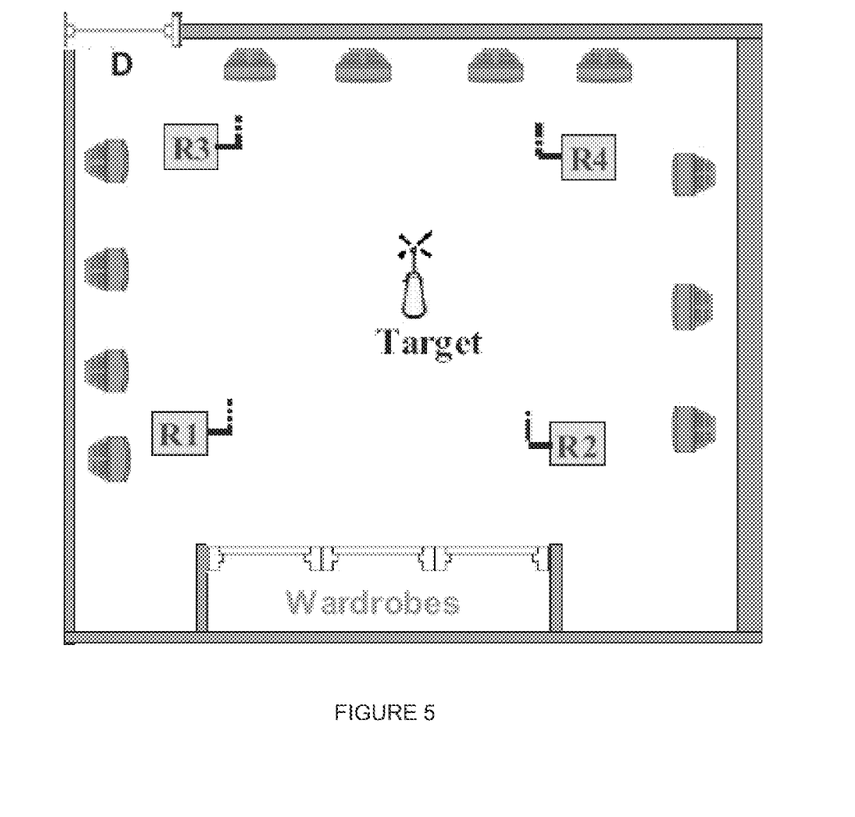
FIG. 5 illustrates the experimental setup for localization, in accordance with the present disclosure.

From FIG. 5, it can be seen that R1, R2, R3, R4 are the reference nodes (positions of these reference nodes are known), placed at four corners of the room and Target node for which the position needs to be estimated. All the reference nodes are assumed to be fixed and target node can be moved to obtain new set of its location estimation result (since the position of the target is unknown we can place this node at any place in the given area and run the algorithm to obtain the new target location). All reference and target nodes support dual radio system and are capable of sending the data to sink node. Once data from all the reference node has been received at the sink, the localization algorithm will be run (on the sink node) and the coordinates of the target node will be found out, which is discussed in next section:

The Methodology of localization in accordance with this disclosure is described. The steps involved in the wireless localization which have been described in earlier sections are as below:

Initial Setup Procedure

Step 0: Generation of RSSI profile

This step is for calibration and needs to done only once or periodically

A. Generate the distance Vs RSSI profile with measurements in multiple polarizations and prepare a derived RSSI profile by quadrature combining as detailed in section 3.

B. Generate a Reference RSSI profile using a polynomial fit to the derived profile.

Localization

Step 1: Configure the mobile node to broadcast the specialized message periodically. The RSSI value corresponding to the reference node is routed to a sink node.

Step 2: The sink node adds ±3 dB offset values to the derived RSSI value received from each node and stores as $S_d$ (i,1) . . . $S_d$(i, 7) where 'i' stands for the ith node and each node represents seven (typical) RSSI values with one measurement, i.e, by incorporating the offset.

Step 3: Run the STAVS algorithm at the sink node to estimate the location of the mobile node.

The present disclosure envisages a method for wireless location estimation of a mobile node using radio transceivers with polarization diversity. The method, in accordance with the present disclosure includes the following steps:

transmitting fixed reference signals using a plurality of fixed transmission module at pre-defined fixed reference nodes distributed over a predetermined area;

transmitting mobile reference signals with respect to the mobile node and the plurality of pre-defined fixed reference nodes with fixed reference signals using mobile node transmission module at the mobile node;

horizontally polarizing the transmitted mobile reference signals;

vertically polarizing the transmitted mobile reference signals;

receiving the horizontally polarized signals and the vertically polarized signals;

measuring signal strength of the received signals;

deriving range of the received signals;

creating a profile of the derived range with reference to the measured signal strength; and employing a trilateration algorithm to determine localization of the node using the created profile, thereby provide the location estimation of the mobile node.

In accordance with the present disclosure, the step of creating a profile further includes the step of creating a profile by quadrature combining the measured signal strength from the horizontally polarized signal and the vertically polarized signal.

In accordance with the present disclosure, the step of creating a profile further includes the step of computing a polynomial fit for the derived profile with a pre-defined monotonic curve as a reference curve for further use in localization estimation.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

While considerable emphasis has been placed herein on the particular features of this disclosure, it will be appreciated that various modifications can be made, and that many changes can be made in the preferred embodiment without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

The invention claimed is:

1. A system for wireless location estimation of a mobile node using radio transceivers with polarization diversity, said system comprising:

a plurality of fixed transmission modules at pre-defined fixed reference nodes distributed over a predetermined area adapted to transmit fixed reference signals;

a mobile node transmission module at the mobile node adapted to transmit mobile reference signals with respect to the mobile node and the plurality of pre-defined fixed reference nodes;

a horizontal polarization module adapted to horizontally polarize the transmitted mobile reference signals;

vertical polarization module adapted to vertically polarize the transmitted mobile reference signals;

a receiver module adapted to receive the horizontally polarized signals and vertically polarized signals;

a measurement module adapted to measure signal strength of the received signals;

a derivation module adapted to derive range of the received signals;

a profile creation module adapted to create a profile of said derived range with reference to said measured signal strength, said profile creation module further comprising a quadrature combining module adapted to create a profile by quadrature combining said measured signal strength from said horizontally polarized signal and said vertically polarized signal; and a trilateration module adapted to employ a trilateration with virtual sampling algorithm to determine localization of said node using said created profile, thereby providing the location estimation of said mobile node.

2. The system as claimed in claim 1 wherein, said profile creation module includes polynomial fitting computation module adapted to compute a polynomial fit for said derived profile with a pre-defined monotonic curve as a reference curve for further use in localization estimation.

3. The system as claimed in claim 1 wherein, said trilateration module is a selection based trilateration module with virtual sampling adapted to reduce the error in estimated localization of said node.

4. A method for wireless location estimation of a mobile node using radio transceivers with polarization diversity, said method comprising the following steps:

transmitting fixed reference signals using a plurality of fixed transmission module at pre-defined fixed reference nodes distributed over a predetermined area;

transmitting mobile reference signals with respect to said mobile node and said plurality of pre-defined fixed reference nodes with fixed reference signals using mobile node transmission module at said mobile node;

horizontally polarizing said transmitted mobile reference signals;

vertically polarizing said transmitted mobile reference signals;

receiving said horizontally polarized signals and said vertically polarized signals;

measuring signal strength of said received signals;

deriving range of said received signals;

creating a profile of said derived range with reference to said measured signal strength, wherein said step of creating a profile includes the step of creating a profile by quadrature combining said measured signal strength from said horizontally polarized signal and said vertically polarized signal; and employing a trilateration with virtual sampling algorithm to determine localization of said node using said created profile, thereby providing the location estimation of said mobile node.

5. The method as claimed in claim 4 wherein, said step of creating a profile includes the step of computing a polynomial fit for said derived profile with a pre-defined monotonic curve as a reference curve for further use in localization estimation.

* * * * *